(12) United States Patent
Wakefield et al.

(10) Patent No.: US 10,606,977 B2
(45) Date of Patent: *Mar. 31, 2020

(54) GRAPHICAL VIEW AND DEBUG FOR COVERAGE-POINT NEGATIVE HINT

(71) Applicant: Synopsys, Inc., Mountain View, CA (US)

(72) Inventors: Alexander John Wakefield, Fort Lauderdale, FL (US); Parijat Biswas, Bengaluru (IN); Pravash Chandra Dash, Bengaluru (IN); Sitikant Sahu, Bengaluru (IN); Sharad Nijhawan, Bengaluru (IN); Ractim Chakraborty, Bengaluru (IN); Manoharan Vellingiri, Sunnyvale, CA (US)

(73) Assignee: SYNOPSYS, INC., Mountain View, CA (US)

(\*) Notice: Subject to any disclaimer, the term of this patent is extended or adjusted under 35 U.S.C. 154(b) by 109 days.

This patent is subject to a terminal disclaimer.

(21) Appl. No.: 15/650,756

(22) Filed: Jul. 14, 2017

(65) Prior Publication Data

US 2017/0316118 A1 Nov. 2, 2017

Related U.S. Application Data

(63) Continuation of application No. 14/208,142, filed on Mar. 13, 2014, now Pat. No. 9,727,678.

(60) Provisional application No. 61/786,209, filed on Mar. 14, 2013.

(51) Int. Cl.
*G06F 17/50* (2006.01)

(52) U.S. Cl.
CPC ........ *G06F 17/5081* (2013.01); *G06F 17/504* (2013.01); *G06F 17/5068* (2013.01); *G06F 17/505* (2013.01); *G06F 17/5022* (2013.01); *G06F 2217/74* (2013.01)

(58) Field of Classification Search
None
See application file for complete search history.

(56) References Cited

U.S. PATENT DOCUMENTS

| 5,537,580 | A | * | 7/1996 | Giomi | ................. G06F 17/5045 716/103 |
| 5,652,909 | A | | 7/1997 | Kodosky | |
| 5,852,449 | A | | 12/1998 | Esslinger et al. | |

(Continued)

OTHER PUBLICATIONS

R.E. Bryant, "Symbolic Manipulation of Boolean Functions Using Graphical Representation," 22nd Design Automation Conference, Paper 42.1, 1985 IEEE, pp. 688-694. (Year: 1985).*
P. Eades et al., "How to Draw a Directed Graph," 1989 IEEE, pp. 13-17. (Year: 1989).*
B. Kapoor et al., "Computing Exact Path Deal-0Fault Coverage Using OBDDs," 1995 IEEE, pp. 234-237. (Year: 1995).*

(Continued)

*Primary Examiner* — Leigh M Garbowski
(74) *Attorney, Agent, or Firm* — Alston & Bird LLP

(57) ABSTRACT

The present invention provides a graphical view of this connected network that allows the user to navigate throughout a network. The graph view consists of a series of nodes that correspond to a set of test, testbench, design or coverage items in the simulation. Various nodes in the network are colored or shaped differently to represent either test, class, stimulus, testbench, design or coverage points. The graph may be drawn so that all items that occur at the same time are lined up in the same horizontal or vertical region, to give the user an intuitive view of time going left to right or top to bottom.

15 Claims, 5 Drawing Sheets

(56) References Cited

U.S. PATENT DOCUMENTS

| | | | |
|---|---|---|---|
| 5,854,926 A * | 12/1998 | Kingsley | G06F 17/5045 |
| | | | 717/156 |
| 5,937,190 A | 8/1999 | Gregory et al. | |
| 6,099,577 A | 8/2000 | Isobe | |
| 6,125,375 A | 9/2000 | Atkins et al. | |
| 6,212,666 B1 | 4/2001 | Gohl et al. | |
| 6,216,252 B1 | 4/2001 | Dangelo et al. | |
| 6,493,868 B1 | 12/2002 | DaSilva et al. | |
| 6,634,012 B2 | 10/2003 | Zhong et al. | |
| 7,079,997 B1 | 7/2006 | Hsu et al. | |
| 7,243,319 B2 | 7/2007 | Ouyang | |
| 7,383,166 B2 | 6/2008 | Ashar et al. | |
| 7,412,674 B1 | 8/2008 | Singhal et al. | |
| 7,523,423 B1 | 4/2009 | Koelbl et al. | |
| 7,707,533 B2 | 4/2010 | McConaghy et al. | |
| 7,873,920 B2 * | 1/2011 | Grose | H04L 41/22 |
| | | | 715/848 |
| 8,050,904 B2 | 11/2011 | Bhadra et al. | |
| 8,306,802 B2 * | 11/2012 | Zhu | G06F 17/504 |
| | | | 703/13 |
| 8,386,974 B2 | 2/2013 | Biswas et al. | |
| 8,443,316 B1 | 5/2013 | Biswas et al. | |
| 8,543,953 B2 | 9/2013 | Boehm | |
| 8,799,838 B2 | 8/2014 | Tanimoto et al. | |
| 9,323,863 B2 * | 4/2016 | Krajec | G06F 16/9024 |
| 9,727,678 B2 | 8/2017 | Wakefield et al. | |
| 2003/0174165 A1 * | 9/2003 | Barney | G06T 11/206 |
| | | | 715/747 |
| 2005/0091025 A1 | 4/2005 | Wilson et al. | |
| 2005/0102594 A1 | 5/2005 | Dey et al. | |

OTHER PUBLICATIONS

X.-D. Tan et al., "Hierarchical Symbolic Analysis of Analog Integrated Circuits via Determinant Decision Diagrams," IEEE Trans. on Computer Aided Design of Integrated Circuits and Systems, vol. 19, No. 4, Apr. 2000, pp. 401-412. (Year: 2000).*

P.-Y. Koenig et al., "Combining DagMaps and Sugiyama Layout for the Navigation of Hierarchical Data," 11th Int'l Conference on Information Visualization (IV'07), 2007 IEEE Computer Society, 6 pages. (Year: 2007).*

Bryant, "Graph-Based Algorithms for Boolean Function Manipulation," IEEE Trans. on Computers, C-35(8):677-691, (1986).

Bryant, "Symbolic Simulation—Techniques and Applications," 27th ACM/IEEE Design Automation Conference, pp. 517-521. 1, (1990).

Casavant et al., "Property-Specific Witness Graph Generation for Guided Simulation," IEEE Proceedings, Design, Automation and Test in Europe, p. 799, (2001).

Feldsbusch et al., "Verification of Synthesized Circuits at Register Transfer Level with Flow Graphs," IEEE, pp. 22-26, (1991).

Gupta et al., "Property-Specific Testbench Generation for Guided Simulation," IEEE Proceedings of the 15th Intl Conference on VLSI Design, pp. 1-8, (2002).

Hoxey et al., "Introduction to symbolic simulation," EE Times, 8 pages, (2005).

U.S. Appl. No. 14/208,142, Final Office Action dated Feb. 10, 2015.
U.S. Appl. No. 14/208,142, Final Office Action dated Jun. 4, 2015.
U.S. Appl. No. 14/208,142, Final Office Action dated Sep. 2, 2016.
U.S. Appl. No. 14/208,142, Non-Final Office Action dated Feb. 3, 2016.
U.S. Appl. No. 14/208,142, Notice of Allowance dated Apr. 4, 2017.

* cited by examiner

GRAPHICAL VIEW AND DEBUG FOR COVERAGE-POINT NEGATIVE HINT

CROSS-REFERENCES TO RELATED APPLICATIONS

The present application is a continuation of U.S. application Ser. No. 14/208,142, filed Mar. 13, 2014, which claims the benefit of priority to U.S. provisional application 61/786,209, filed Mar. 14, 2013, the contents of all of which are incorporated herein by reference in their entirety.

BACKGROUND OF THE INVENTION

Field of the Invention

The present invention relates to techniques for verifying the correctness of an integrated circuit design, and in particular to accelerating coverage convergence using symbolic properties together with a directed graph that represents a reason a coverage point cannot be hit after symbolic simulation.

Related Art

Integrated circuit designs have increasingly higher complexity. This complexity makes determining the correctness of the design both difficult and resource intensive. To verify the correctness of a design, a verification tool typically applies stimuli to the design under verification (DUV). In general, many stimuli and simulation runs are needed to achieve a reasonable coverage of the behavior of the DUV. The simulation outputs of the DUV can be compared to expected outputs to determine whether the design is providing the desired functionality.

Coverage is a key metric that measures the quality and project completeness in the functional verification of the design. Types of coverage targets can be characterized as either functional coverage targets or code coverage targets. In a functional coverage target, a user wants some scenario to happen in the design. For example, the user wants signal A to have value X at the same time that signal B has value Y. In contrast, the code coverage target can include branch (if, case) statement, and line coverage. These types of coverage targets are well known and therefore not described in further detail.

Note that conventional simulations cannot generate such scenario information—hence the need for the user to specify coverage targets in a test bench. For example, FIG. 1 illustrates a conventional environment for a verification tool with an open loop, coverage convergence technique. In this environment, variables 101 of the hardware description language (HDL) code (typically in a register transfer level (RTL) format) of a design 103 are identified. In one embodiment, variables 101 are the input variables of design 103. In another embodiment, variables 101 are the input variables of specific starting points in design 103. After identification, randomized values 102 (i.e. stimuli) for variables 101 can be generated.

These randomized values 102 as well as user-provided coverage targets 104 can be provided to design 103 for simulation. In one embodiment, these simulations can be performed using a test bench 106 and design 103 is then typically referred to as a device-under-test (DUT). In another embodiment, the randomized values 102 can also be generated by test bench 106. The simulation results can be analyzed using functional verification and then provided to the user as coverage results 105.

Conventional functional verification uses constrained random simulation, which enables users to go from 0 to 80-90% coverage by automatically creating thousands of tests (i.e. different stimuli). However, getting the remaining 10-20% coverage is a very time consuming and difficult manual process. Typically, this process requires that verification engineers work with design engineers to analyze the coverage obtained so far, identify coverage holes, determine the reasons for not reaching the missing coverage targets, and write new tests to hit the missing targets and achieve coverage convergence. Unfortunately, this coverage convergence phase of verification can take up to 30% of the overall chip development cycle.

Previous techniques for automatically reaching the missing coverage targets have encountered severe scalability problems and require extensive modifications to existing verification tools. One such technique relies on randomly changing paths based on symbolic properties with the goal of executing new, previously un-explored branches in the code.

A method for increasing coverage convergence during verification of a design for an integrated circuit is provided is disclosed in US Patent Application 20120266118 entitled Accelerating Coverage Convergence Using Symbolic Properties, filed Apr. 14, 2011, the disclosure of which is incorporated herein by reference. In this method, multiple simulation runs are performed. Symbolic variables and symbolic expressions can be generated for the variables and the variable expressions in the hardware code of the design and a test bench. Exemplary hardware code includes the hardware description language (HDL) code and/or the hardware verification language (HVL) code and/or a stimulus graph description. Symbolic properties, which are derived from propagating the symbolic variables and symbolic expressions through the design and the test bench during the multiple simulation runs, can be collected. Coverage information from the multiple simulation runs can be analyzed to identify coverage points to be targeted. At this point, for each identified coverage point, the constraints resulting from the collected symbolic properties can be solved to generate directed stimuli for the design. These directed stimuli can increase the coverage convergence.

However, no tool has a concise way to display cause-effect data from a symbolic simulation.

BRIEF SUMMARY OF THE INVENTION

A graph view is needed to allow the user to navigate the large data set and not become quickly lost in the network and is essential to wide adoption of symbolic-simulation technology. The present invention provides a directed graph that represents the reason a coverage point cannot be hit after symbolic simulation and analysis. The graph provides a roadmap of the complex temporal network (reason) a point cannot be hit. The graph is directed to show how the symbol values flowed from one item to another during the simulation, and colored and shaped for various analysis. Links to the source code of the integrated circuit are provided along with a source view to allow the source to be viewed for each item in the graph.

This graph shows the temporal logic diagram of the design, but is filtered to show data for only the selected coverage point, and pruned to remove any items that do not impact the reason for unreachability. The entire logic graph is often many times or orders of magnitude larger than the minimal conflict graph set that is displayed.

DETAILED DESCRIPTION OF THE INVENTION

Definition of the Terms

Symbolic simulation refers to the iterative symbolic exploration of the state space of a circuit. Symbolic simulation uses a symbol-network to store symbols for RTL or testbench elements. Elements in the symbolic simulation that have a random value have a corresponding symbol in the symbol network. Each symbol may be an equation if the symbol is calculated using other symbol values. In the symbol network any non-random values will simply have the value from the value network.

Example

| Bit [3:0] a, b, c; | //value-network | //symbol-network |
|---|---|---|
| A = 1; | a = 1 | a = 1 |
| B = $random; | b = 2 | b = <b> |
| C = a + b; | c = 3 | c = "<b> + 1" |
| @posedge clock; | | |
| C = c + b; | c = 5 | c = "<b> + 1 + <b>" |

The term "symbolic variable" refers to a symbolic representation of any variable that can have a random value. A variable can be defined over a set of logic expression such as {0, 1, x, z} or a Boolean expression {true, false}. A variable in the circuit design that has a random value also has a corresponding symbol generated for it.

The term "symbolic expression" refers to an equation for the symbolic value of a variable, as an equation not a computed value.

The term "symbolic property" refers to a symbolic expression for a specific symbolic variable at some point in time.

Figure 1:
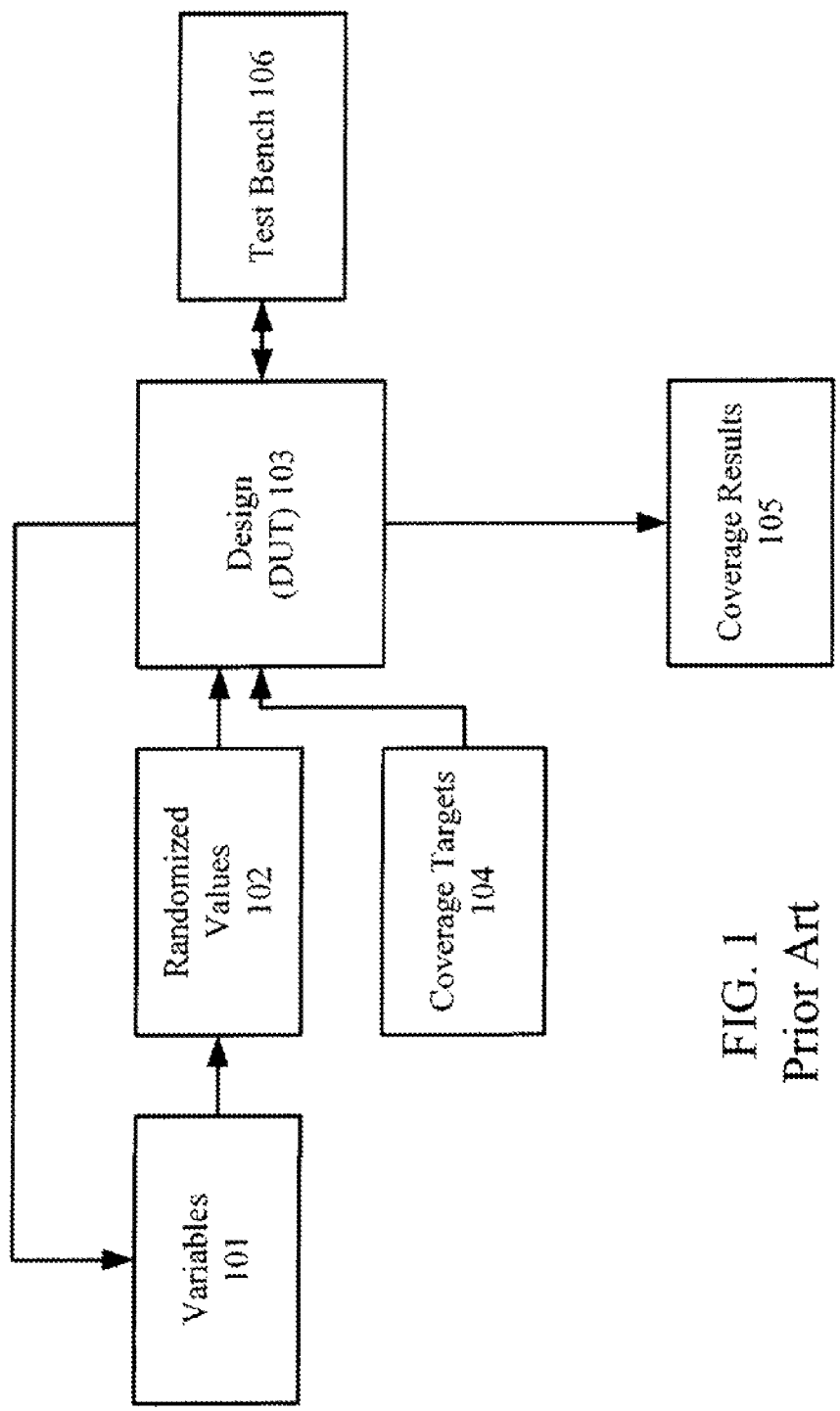
FIG. 1 illustrates a conventional environment for a verification tool with an open loop, coverage convergence technique.
Figure 2:
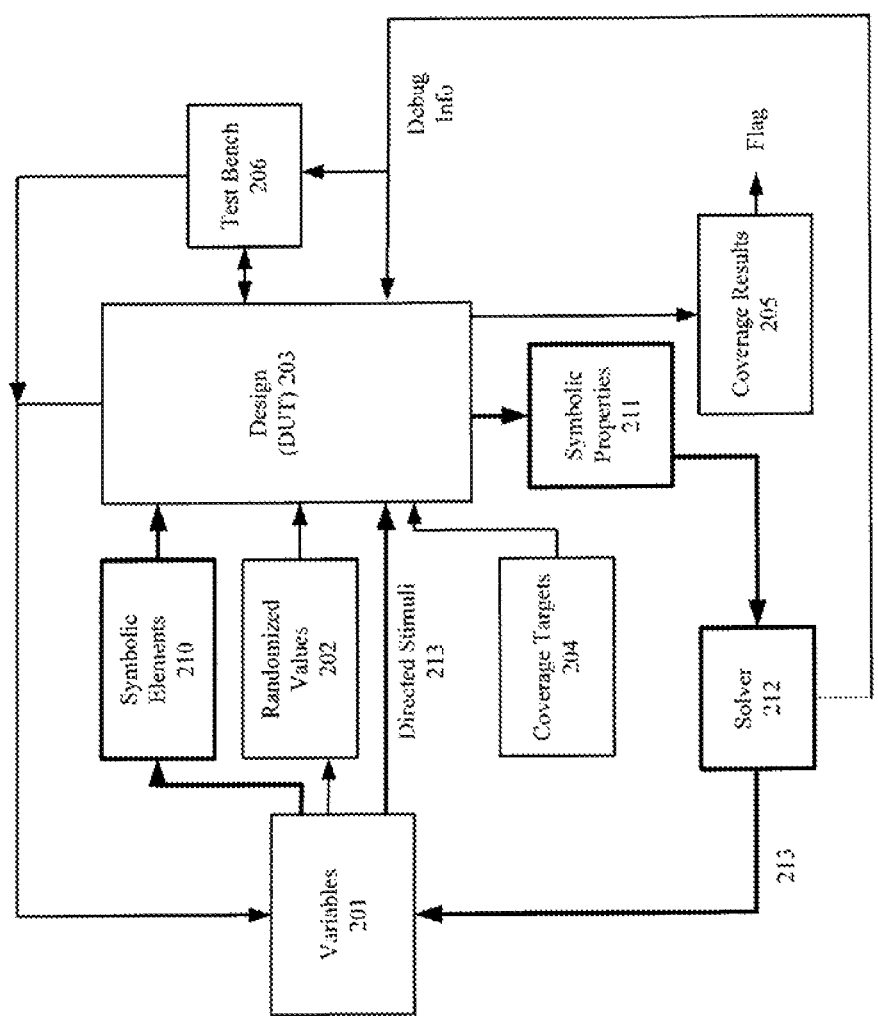
FIG. 2 illustrates an exemplary environment for a verification tool with a closed loop, coverage convergence technique.

FIG. 2 illustrates an improved environment for a verification tool, which can leverage symbolic properties to achieve higher and faster coverage convergence than conventional tools. In this environment, variables 201 of the hardware code of a design 203 and a test bench 206 can be identified. Exemplary hardware code can include hardware description language (HDL) code and/or hardware verification language (HVL) code and/or graph based stimulus. In one embodiment, variables 201 that have a random value may also have a corresponding symbolic element 210 generated for them. Symbolic elements (or symbols) 210 can then be used to generate the required symbolic expressions (or symbolic equations) as the simulation progresses. Hereinafter, symbolic elements and symbols are used alternatively. Symbolic expressions and symbolic equations are used alternatively. In one embodiment, variables 201 can include the input variables of design 203. In another embodiment, variables 201 can include the input variables of specific starting points in design 203. After identification, randomized values 202 (i.e. stimuli) can be generated for variables 201 (called constrained random verification).

These randomized values 202 as well as user-provided coverage targets 204 can be provided to design 203 for simulation. In one embodiment, these simulations can be performed using a test bench 206 and design 203 is then typically referred to as a device-under-test (DUT). In another embodiment, the randomized values 202 can also be generated by test bench 206. In yet another embodiment, coverage targets 204 can be entered via test bench 206. The simulation results can be analyzed using functional verification and then provided to the user as coverage results 205.

Note that the verification tool performs many simulation runs, each run with new values for variables 201 (also called legal inputs for the test). As simulations are performed during those multiple runs, the verification tool accumulates information to evaluate the feasibility of reaching coverage targets. Coverage targets can be reached by executing the simulation code using the generated values of the variables to create a certain condition or certain combinations of conditions in the design, as specified by coverage targets 204. Thus, coverage results 205 effectively determine whether the desired conditions were created.

When the desired conditions are not created by constrained random verification, it is extremely difficult for the user to manually generate directed tests (i.e. assign specific values to the variables) and/or manipulate constraints to achieve those desired conditions. Therefore, in one embodiment, after constrained random verification is run for a predetermined period and coverage results 205 still indicate less than full coverage convergence (which typically occurs for any large, complex design), a flag can be generated. This flag can trigger the generation of symbolic variables and expressions.

In accordance with one aspect of an improved coverage convergence technique, the accumulated intelligence from propagated symbolic variables and expressions through the design and the test bench can advantageously provide a suggested mapping of actual values to variables to achieve target coverage. This accumulated intelligence can be characterized as symbolic properties, wherein a symbolic property is a factual statement about the expected or assumed behavior of a symbolic variable or expression. In one embodiment, when such mapping is not possible, then the verification tool can indicate why and provide enough information to generate some actionable feedback, i.e. a modification of one or more constraints and/or design elements, to minimize coverage non-convergence.

Note that one reason that target coverage cannot be achieved is because of a bug. Therefore, in one embodiment, actionable feedback generated by solver 212 may include debugging information, which can be provided to design (DUT) 203 and test bench 206. Debugging information may include constraint modifications. For example, a constraint may be loosened when too tight (e.g. a variable value set to 5-10 should instead be set to 0-10) or vice versa. Debugging information may also include modified sequential code. For example, the sequential code in the test bench or in the design may have some statements that change the stimulus to an extent that the target coverage is not achieved.

Prior art tools do not have a concise way to display cause-effect data from a symbolic simulation. Accordingly, the present invention provides a graph view to allow the user to navigate the large data set and not become quickly lost in the network. This graphical display of information on a display screen or on hard copy is essential to widespread adoption of symbolic-simulation technology. A representative graph is shown in FIG. 3.

Figure 3:
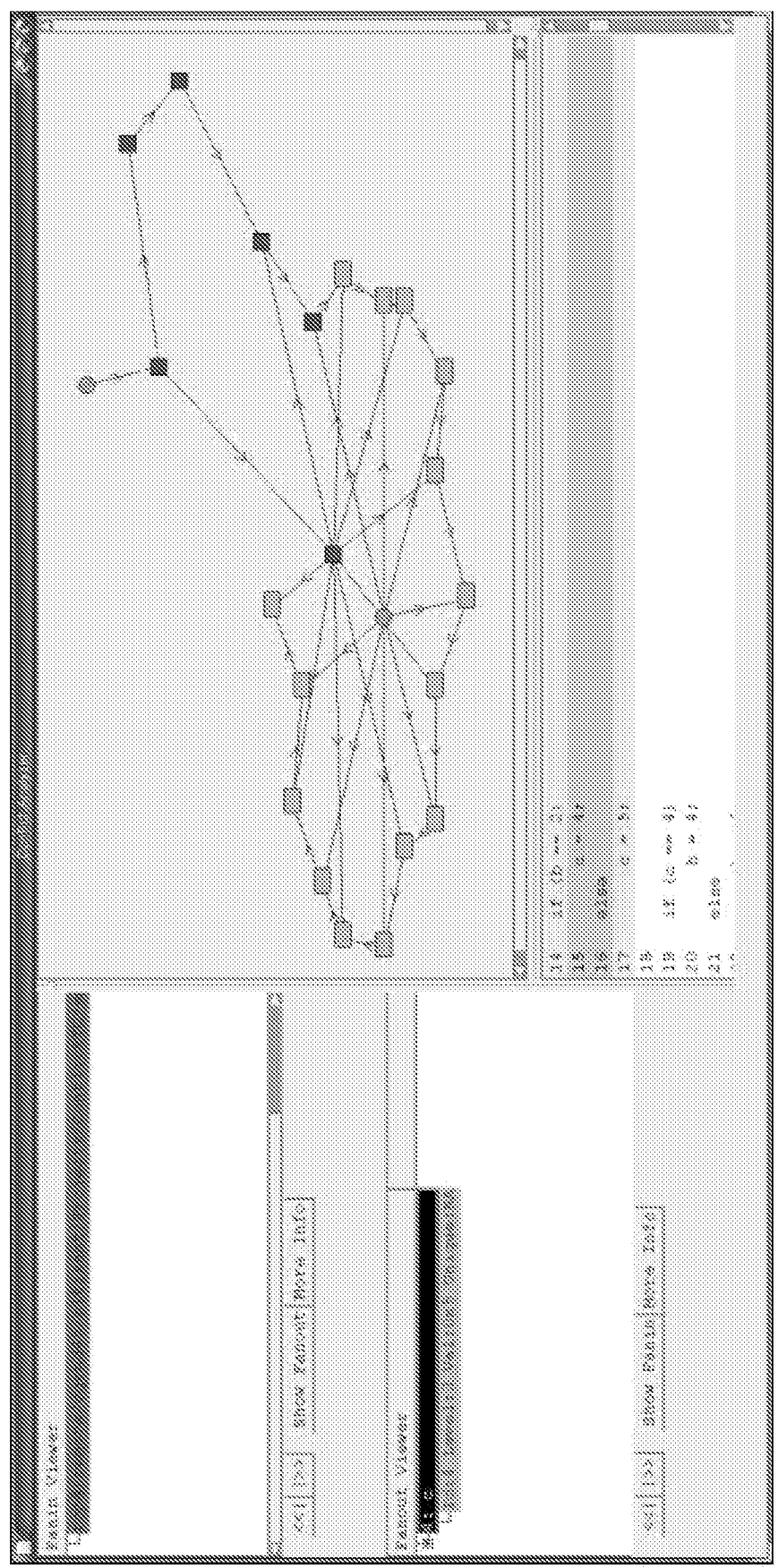
FIG. 3 illustrates a representative graph view.

The graph in FIG. 3 shows the minimal conflicting constraint set for a negative hint, which is the reason why the coverage point cannot be hit. The random variables are shown as a circle, the testbench and RTL variables are shown as a square and the class/test constraints are shown as a rectangle. The connections between each of these elements are drawn to represent the equation or constraints between the variables.

The cause-effect relationship between the various nodes in the graph is also displayed. This information was calculated using the flow of symbols through the symbolic network. The symbol flow (displayed as a direction in the graph) shows how one piece of testbench or design code affects another piece. This direction allows the user to debug the problem by focusing on how the information flows through the graph rather than providing a non-directed graph where direction would need to be interpreted by the user.

Symbolic simulation allows us to generate a set of temporal equations for a design, and extract this temporal network from random-stimulus points through the test, testbench and design to a coverage point. Solving these extracted equations then provides either a positive hint (solution) or negative hint (no solution, and conflicting equation set). The conflicting equation set represents the reason why a coverage point cannot be reached using the given test, testbench, and design for any valid random stimulus combination. Interpreting this conflicting equation set is complex, as the equations and line of code are complex, and the set of data involved is often heavily connected and the user quickly becomes lost while trying to navigate the equations.

The present invention provides a graphical view of this connected network that allows the user to navigate throughout the network. The graph view consists of a series of nodes that correspond to a set of test, testbench, design or coverage items in the simulation. Various nodes in the network are colored or shaped differently to represent either test, class, stimulus, testbench, design or coverage points. The graph may be drawn so that all items that occur at the same time are lined up in the same horizontal or vertical region, to give the user an intuitive view of time going left to right or top to bottom.

Elements that represent the same variable or code item may be lined up to emphasize that these items are the same item, separated by time. For example a finite-state-machine register will likely appear multiple times in the graph at different times, each instance representing one state that must be transitioned through to reach a specific coverage point. These elements may also be colored, shaped or highlighted when selected to show the user the other time-related copies in the graph.

The graph is directed, showing the direction that the symbols in the simulation flowed. This allows the user to see reconvergent paths, where both of the paths cannot be satisfied, and then allow the user to investigate the reason for reconvergence. Nodes with high fanin or fanout are of higher importance, as these nodes may indicate the reason why the coverage point cannot be hit, or suggest that if these items are modified then the network can be solved.

The graph also has values annotated, to show the value that each variable had when the simulation was run, and also the value that is required if the coverage-point is to be hit. This data allows the user to see the current and needed value in one location.

When a node is selected, the node is highlighted, and the fanin and fanout nets are colored. A fanin viewer also displays a small tree showing the names and other details of the nets fanning into the selected node. A fanout viewer shows a tree with names and other details of the nets fanning out from the selected node. The source code highlights the line(s) of code that correspond to this node. The important fanin variables in the source code expression may also be highlighted in some manner to stress their importance.

A representative graph is shown in FIG. 3. In this graph a single random variable can be seen in the center, fanning out to many class constraints. This variable is one of the key reasons why the coverage point cannot be hit, and the user can focus on this variable for analysis. Selecting the variable or other item in the graph causes the related code to be displayed and highlighted below.

A re-convergent path is also visible in the upper right section of the graph. From the upper green circle (random variable) two paths with direction indicated by arrows can be seen. One path goes to the upper right for 3 red nodes, while the second path goes to the left and both meet at a common red node. This re-convergent path/shape can be easily seen using the graphical format; however this would require considerable analysis and time to identify using text or other means.

Figure 4:
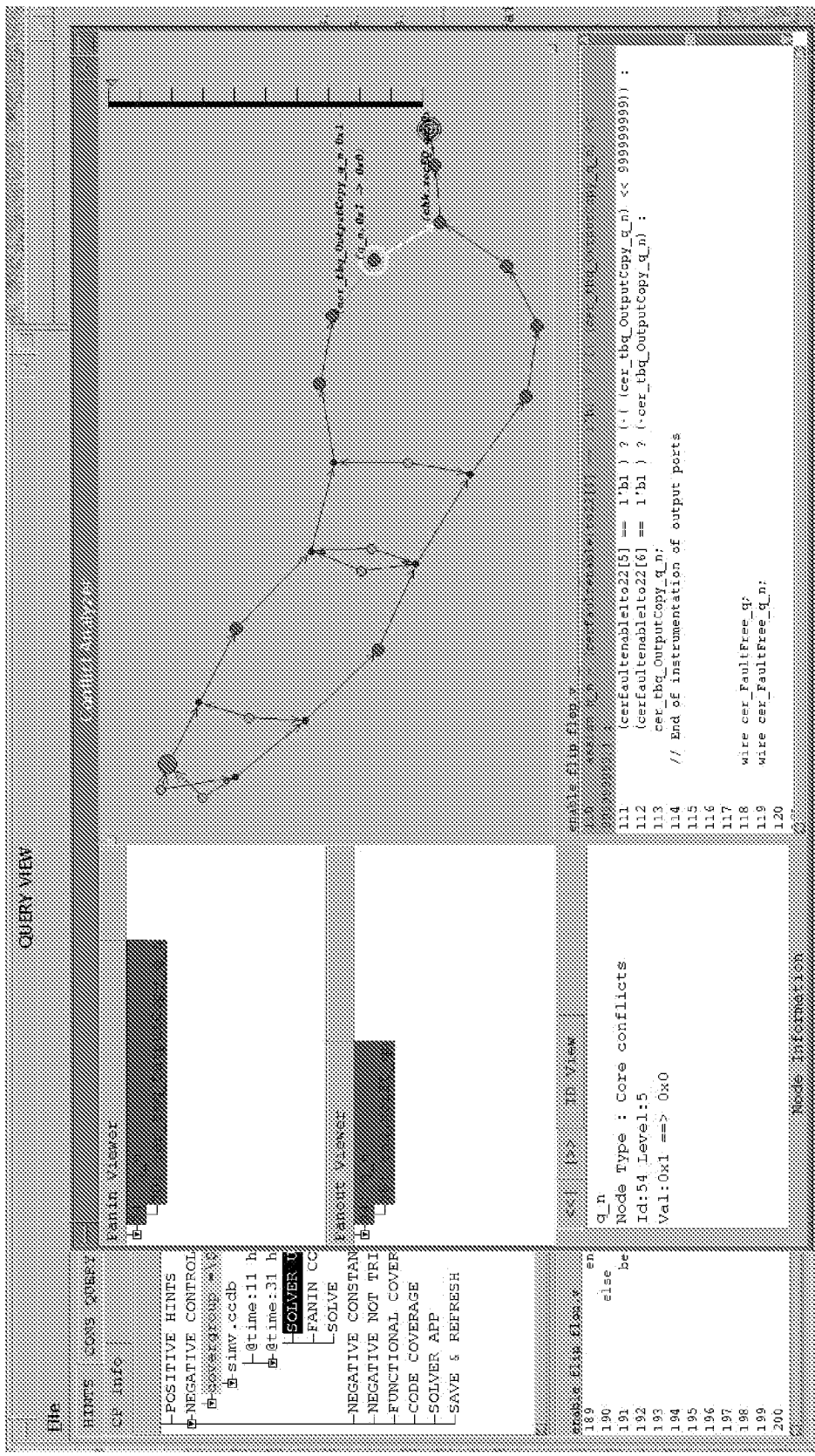
FIG. 4 illustrates a representative graph view.

Another representative graph is shown in FIG. 4. In this graph class constraints are visible on the left hand side that fan-out to two paths eventually re-converging just before the coverage point. The coverage point is shown by the target icon and any temporary intermediate nodes introduced by symbolic simulation are shown as small blue dots. It is clear that several random variables are present in this network, and several of them fan-out to both branches of the re-convergent path. Direction of the symbol flow is shown using arrows. Links to the source code are provided as the user navigates throughout the graph. The advantage of showing the information as a graph is evident and significantly easier to understand than a pure text report. In one embodiment, the graph may have elements that are in a reconvergent path, which is difficult to see from a text-based report. In one embodiment, the user (designed) can click on each element of the path and see the corresponding equation, symbol, and line of user-code associated to that path or to a node on that path. That way, the connection between the nodes is easy to navigate and the relationship between various nodes can be easily observed.

In one embodiment, the value of each node from simulation is displayed. In another embodiment, the value that would be required to reach the coverage point is also displayed. Each node thus has the pair of values (simulation value and coverage value) displayed when the user selects the node. For example, the node may show an element A that has a value "0×0", and the required value should be "0×1" to reach the target coverage.

Each node has a value from event-based simulation and a set of equations from the symbolic simulation. Analyzing the value, equations and design results in a range of possible values for the node, in addition to the required value and the actual value that occurred. This information is displayed on each node and is useful for determining why the node cannot achieve the required value.

Figure 5:
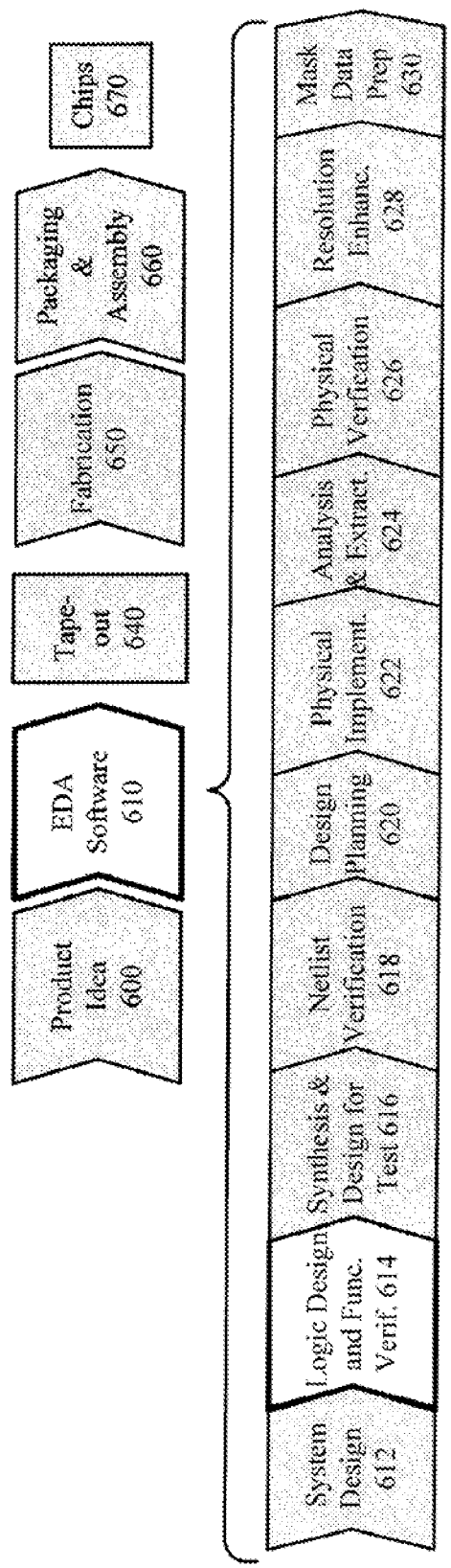
FIG. 5 illustrates a simplified representation of an exemplary digital ASIC design flow, which provides the context for the coverage convergence technique using symbolic properties.

FIG. 5 illustrates a simplified representation of an exemplary digital ASIC design flow, which provides the context for the coverage convergence technique described above. At a high level, the process starts with the product idea (step 600) and is realized in an EDA software design process (step 610). When the design is finalized, it can be taped-out (event 640). After tape out, the fabrication process (step 650) as well as packaging and assembly processes (step 660) can occur, thereby resulting in finished chips (result 670).

The EDA software design process (step 610) is actually composed of a number of steps 612-630, shown in linear fashion for simplicity. In an actual ASIC design process, the particular design might have to go back through steps until certain tests are passed. Similarly, in any actual design process, these steps may occur in different orders and combinations. This description is therefore provided by way of context and general explanation rather than as a specific, or recommended, design flow for a particular ASIC.

A brief description of the components steps of the EDA software design process (step 610) will now be provided. In system design (step 612), the designers can describe the functionality that they want to implement, perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

In logic design and functional verification (step 614), the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products. In one embodiment, the above-described coverage convergence technique can be implemented in the VCS tool, which is run during step 614.

In synthesis and design for test (step 616), the VHDL/Verilog code is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, Tetramax, and DesignWare® products.

In netlist verification (step 618), the netlist is checked for compliance with timing constraints and for correspondence with the VHDL/Verilog source code. Exemplary EDA software products from Synopsys, Inc. that can be used at this step include Formality, PrimeTime, and VCS products. In one embodiment, the samples-based, multi-corner static timing analysis can be used in step 618.

In design planning (step 620), an overall floorplan for the chip is constructed and analyzed for timing and top-level routing. Exemplary EDA software products from Synopsys, Inc. that can be used at this step include Astro and IC Compiler products.

In physical implementation (step 622), the placement (positioning of circuit elements) and routing (connection of the same) can occur. Exemplary EDA software products from Synopsys, Inc. that can be used at this step include the Astro and IC Compiler products.

In analysis and extraction (step 624), the circuit function is verified at a transistor level, which in turn permits what-if refinement. Exemplary EDA software products from Synopsys, Inc. that can be used at this step include AstroRail, PrimeRail, Primetime, and Star RC/XT products.

In physical verification (step 626), various checking functions are performed to ensure correctness for manufacturing, electrical issues, lithographic issues, and circuitry. Exemplary EDA software products from Synopsys, Inc. that can be used at this step include the Hercules product.

In resolution enhancement (step 628), geometric manipulations of the layout can be performed to improve manufacturability of the design. Exemplary EDA software products from Synopsys, Inc. that can be used at this step include Proteus, ProteusAF, and PSMGen products.

In mask data preparation (step 630), the "tape-out" data for production of masks can be lithographically used to produce the integrated circuit chips. Exemplary EDA software products from Synopsys, Inc. that can be used at this step include the CATS(R) family of products.

The coverage convergence technique described above can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

What is claimed is:
1. A method for verifying a design of an electronic circuit, the method comprising:
simulating the design; and
displaying a directed graph representative of the simulated design,
wherein the directed graph is a navigable and graphical view of cause-effect data from a symbolic simulation, wherein the directed graph comprising a plurality of shapes each having a different color, wherein at least one of the shapes is associated with a plurality of variables of the design, wherein a direction of at least one of the paths of the directed graph is defined by a temporal relationship between at least first and second variables of the design.

2. The method of claim 1 wherein the direction of the at least one path of the graph is further defined by a testbench applied to simulate the design.

3. The method of claim 1 wherein the directed graph includes a plurality of paths each showing a propagating direction associated with at least one variable through the path.

4. The method of claim 3 wherein the plurality of paths are displayed concurrently with associated portions of the design or a testbench applied to simulate the design.

5. The method of claim 1 further comprising:
displaying at least a subset of the plurality of variables that transition at substantially a same time along a horizontal or vertical direction.

6. The method of claim 1 further comprising annotating the directed graph with values of the plurality of variables resulting from the simulation.

7. The method of claim 6 further comprising:
specifying a target coverage; and
displaying values of the plurality of variables required to achieve the specified target coverage.

8. A computer system configured to:
Simulate, via a processor, a circuit design; and
display a directed graph representative of the simulated design, wherein the directed graph is a navigable and graphical view of cause-effect data from a symbolic simulation,
wherein the directed graph comprising a plurality of shapes each having a different color, wherein at least one of the shapes is associated with a plurality of variables of the design, wherein a direction of at least one of the paths of the directed graph is defined by a temporal relationship between at least first and second plurality of variables.

9. The computer system of claim 8 wherein the direction of the at least one path of the graph is further defined by a testbench applied to simulate the design.

10. The computer system of claim 8 wherein the directed graph includes a plurality of paths each showing a propagating direction associated with at least one variable through the path.

11. The computer system of claim 10 wherein computer system is further configured to display the plurality of paths concurrently with associated portions of the design or a testbench applied to simulate the design.

12. The computer system of claim 8 wherein computer system is further configured to display at least a subset of the plurality of variables that transition at substantially a same time a
long a horizontal or vertical direction.

13. The computer system of claim 8 wherein the computer system is further configured to annotate the directed graph with values of the plurality of variables resulting from the simulation.

14. The computer system of claim 13 where in the computer system is further configured to:
specify a target coverage; and
display values of the plurality of variables required to achieve the specified target coverage.

15. A method for navigating a large data set during a symbolic simulation to determine a reason for unreachability comprising:
performing, via a processor, a symbolic simulation of the large data set to generate a plurality of symbol values;
generating a directed graph to show how the symbol values flowed during the symbolic simulation, wherein the directed graph is navigable and graphical view of cause-effect data from a symbolic simulation,
wherein the symbol values colored and shaped for various analysis wherein at least one of the shapes is associated with a plurality of variables, wherein a direction of at least one of the paths of the directed graph is defined by a temporal relationship between at least first and second variables.

* * * * *